(12) United States Patent
Deguchi

(10) Patent No.: US 7,127,454 B2
(45) Date of Patent: Oct. 24, 2006

(54) E-MARKER FIND MUSIC

(75) Inventor: Yuichiro Deguchi, San Mateo, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 376 days.

(21) Appl. No.: 09/932,664

(22) Filed: Aug. 17, 2001

(65) Prior Publication Data

US 2003/0037035 A1   Feb. 20, 2003

(51) Int. Cl.
*G06F 17/30* (2006.01)

(52) U.S. Cl. .................. 707/3; 707/10; 707/104.1

(58) Field of Classification Search .............. 707/1–3, 707/9–10, 104; 455/419, 403
See application file for complete search history.

(56) References Cited

U.S. PATENT DOCUMENTS

| | | | |
|---|---|---|---|
| 3,836,842 A | 9/1974 | Zimmermann et al. | |
| 5,199,009 A | 3/1993 | Svast | |
| 5,297,118 A | 3/1994 | Sakumoto | |
| 5,508,978 A | 4/1996 | Kalbermatter et al. | |
| 5,579,472 A | 11/1996 | Keyworth, II et al. | |
| 5,758,257 A * | 5/1998 | Herz et al. ............... | 725/116 |
| 5,850,218 A | 12/1998 | LaJoie et al. | |
| 5,889,737 A | 3/1999 | Alameh et al. | |
| 5,915,288 A | 6/1999 | Gabriel | |
| 6,088,021 A | 7/2000 | Young | |
| 6,100,884 A * | 8/2000 | Tomita et al. ............ | 345/721 |
| 6,104,334 A | 8/2000 | Allport | |
| 6,128,009 A | 10/2000 | Ohkura et al. | |
| 6,144,864 A | 11/2000 | Lands et al. | |
| 6,148,261 A | 11/2000 | Obradovich et al. | |
| 6,158,884 A | 12/2000 | Lebby et al. | |
| 6,169,498 B1 | 1/2001 | King et al. | |
| 6,199,125 B1 | 3/2001 | Cortesi | |
| 6,216,230 B1 | 4/2001 | Rallis et al. | |
| 6,230,172 B1 | 5/2001 | Purnaveja et al. | |
| 6,263,438 B1 | 7/2001 | Walker et al. | |
| 6,272,545 B1 | 8/2001 | Flanagin et al. | |
| 6,289,346 B1 | 9/2001 | Milewski et al. | |
| 6,290,517 B1 | 9/2001 | Anderson | |
| 6,304,249 B1 | 10/2001 | Derocher et al. | |
| 6,323,783 B1 | 11/2001 | Lizzi | |
| 6,330,490 B1 * | 12/2001 | Kim et al. ................ | 700/324 |
| 6,353,398 B1 | 3/2002 | Amin et al. | |
| 6,356,971 B1 | 3/2002 | Katz et al. | |
| 6,360,209 B1 | 3/2002 | Loeb et al. | |
| 6,392,635 B1 | 5/2002 | Snyder | |
| 6,425,081 B1 | 7/2002 | Iwamura | |
| 6,427,175 B1 | 7/2002 | Khan et al. | |
| 6,493,702 B1 | 12/2002 | Adara et al. | |
| 6,507,727 B1 | 1/2003 | Henrick | |
| 6,515,595 B1 | 2/2003 | Obradovich et al. | |

(Continued)

OTHER PUBLICATIONS

Fried, Lan, Music bookmarking form to close its doors, CNET News.com, Sep. 19, 2000.*

(Continued)

*Primary Examiner*—Debbie M. Le
(74) *Attorney, Agent, or Firm*—John P. O'Banion

(57) ABSTRACT

Method and system for providing a data marking device data searching system including a user terminal connected to a server terminal over an internet connection for transmitting find music search request, the server terminal in response accessing one or more storage units and retrieving corresponding information such as other marked data for transmission to the user terminal is disclosed.

18 Claims, 12 Drawing Sheets

U.S. PATENT DOCUMENTS

| | | | |
|---|---|---|---|
| 6,556,513 B1 | 4/2003 | Wimberly | |
| 6,559,773 B1 | 5/2003 | Berry | |
| 6,571,577 B1 | 6/2003 | Radley-Smith | |
| 6,578,047 B1* | 6/2003 | Deguchi | 707/104.1 |
| 6,637,028 B1 | 10/2003 | Voyticky et al. | |
| 6,650,534 B1 | 11/2003 | Tree | |
| 6,650,877 B1 | 11/2003 | Tarbouriech et al. | |
| 6,674,993 B1 | 1/2004 | Tarbouriech | |
| 6,680,714 B1 | 1/2004 | Wilmore | |
| 6,763,371 B1 | 7/2004 | Jandel | |
| 6,933,433 B1* | 8/2005 | Porteus et al. | 84/615 |
| 2001/0019618 A1 | 9/2001 | Rhoads | |
| 2001/0020239 A1 | 9/2001 | Ukigawa | |
| 2001/0034219 A1* | 10/2001 | Hewitt et al. | |
| 2001/0040977 A1 | 11/2001 | Nakano | |
| 2001/0051996 A1 | 12/2001 | Cooper et al. | |
| 2002/0007354 A1 | 1/2002 | Deguchi | |
| 2002/0023272 A1 | 2/2002 | Pocock | |
| 2002/0032019 A1* | 3/2002 | Marks et al. | 455/414 |
| 2002/0032698 A1 | 3/2002 | Cox | |
| 2002/0056084 A1 | 5/2002 | Harris et al. | |
| 2002/0068991 A1 | 6/2002 | Fitsimmons | |
| 2002/0120850 A1 | 8/2002 | Walker et al. | |
| 2002/0162009 A1 | 10/2002 | Shmueli et al. | |
| 2002/0164973 A1* | 11/2002 | Janik et al. | |
| 2002/0174372 A1 | 11/2002 | Vankataraman | |
| 2002/0174431 A1* | 11/2002 | Bowman et al. | 725/47 |
| 2002/0186886 A1 | 12/2002 | Rhoads | |
| 2002/0194619 A1* | 12/2002 | Chang et al. | |
| 2003/0005433 A1* | 1/2003 | Janik et al. | |
| 2003/0012403 A1 | 1/2003 | Rhoads et al. | |
| 2003/0023421 A1* | 1/2003 | Finn et al. | |
| 2003/0027634 A1 | 2/2003 | Matthews, III | |
| 2003/0097351 A1 | 5/2003 | Rothschild et al. | |
| 2003/0103645 A1 | 6/2003 | Leza | |
| 2003/0174167 A1 | 9/2003 | Poo et al. | |
| 2003/0217206 A1 | 11/2003 | Poo | |
| 2004/0171377 A1* | 9/2004 | Engstrom | 455/419 |
| 2004/0203729 A1 | 10/2004 | Makipaa et al. | |

OTHER PUBLICATIONS

Fried, Lan, Sony device bookmark music heard on radio, CNET News.com, Jun. 9, 2000.*

Fried, Lan, Sony writes swan song for radio service, CNET News.com, Sep. 5, 2001.*

Hanlon, NIck, Bookmark your radio, www.edgereview.com.*

* cited by examiner

| Device ID: K01-U23-N45-I67 | | |
|---|---|---|
| Bookmark | Date | Time |
| Bookmark #1 | 1/21/01 | 13:46 |
| Bookmark #2 | 1/21/01 | 13:51 |
| Bookmark #3 | 1/21/01 | 14:07 |
| Bookmark #4 | 1/21/01 | 19:41 |
| Bookmark #5 | 1/21/01 | 21:45 |
| Bookmark #6 | 1/21/01 | 22:01 |

| User Name | Marker ID | User Account Name | User Billing Information | User Contact Information |
|---|---|---|---|---|
| John First | A11-K21-K43-F23 | FirstJ | VS: 5485-5647-8821-0012 | firstj@yahoo.com |
| Matt Sawyer | K01-U23-N45-167 | Msawyer | DIS: 456-85468-45441 | mattsaw@netzero.com |
| Steve Sansnishi | B32-F32-V67-J88 | Tznet | MS: 3215-5649-1300-8745 | tz@greatnet.net |
| Helen Owen | B33-D23-D45-K12 | Howen | AM: 1245-856978-01147 | hoh@aol.com |
| Jack Green | B32-F32-V67-J88 | JGG | VS: 1245-5412-8547-5565 | greenj@home.net |

| Broadcast Time | Name of Music Clip | Name of Artist | Name of Album |
|---|---|---|---|
| 12:14; 2/1/01 | Ride the Lightning | Metallica | Ride the Lightning |
| 12:19; 2/1/01 | Sweet Child O' Mine | Guns N' Roses | Appetite for Destruction |
| 12:24; 2/1/01 | The Show Must Go On | Pink Floyd | The Wall |
| 12:29; 2/1/01 | Fade to Black | Metallica | Ride the Lightning |
| 12:36; 2/1/01 | Paradise City | Guns N' Roses | Appetite for Destruction |
| 12:41; 2/1/01 | Hey You | Pink Floyd | The Wall |
| 12:48; 2/1/01 | Mr. Brownstone | Guns N' Roses | Appetite for Destruction |
| 12:53; 2/1/01 | Run to the Hills | Iron Maiden | Powerslave |
| 12:59; 2/1/01 | For Whom the Bell Tolls | Metallica | Ride the Lightning |

| Music Title | Name of Artist | Broadcast Event | Broadcast Station | Genre |
|---|---|---|---|---|
| Ride the Lightning | Metallica | 12:14; 2/1/01 | KROK | Hard Rock |
| Brand New Day | Sting | 12:24; 2/1/01 | KLIT | Soft Rock |
| Fade to Black | Metallica | 12:29; 2/1/01 | KROK | Hard Rock |
| Helter Skelter | U2 | 12:37; 2/1/01 | KCGO | Soft Rock |
| Run to the Hills | Iron Maiden | 12:53; 2/1/01 | KROK | Hard Rock |

FIG. 11

E-MARKER FIND MUSIC

FIELD OF THE INVENTION

The present invention relates to electronic music marker devices. More particularly, the present invention relates to method and system for identifying, locating and sharing bookmarked music clips.

BACKGROUND OF THE INVENTION

Sony Corporation and its U.S. subsidiary, Sony Electronics, Inc., introduced an electronic music marker device which is capable of "bookmarking" a music clip while being played on a radio and, which, when synchronized with a gateway device such as a personal computer, is capable of recalling information related to the bookmarked music clip such as the name of the song, the artist, the album containing the song and so on. Using the electronic music marker device, a user can conveniently recall the music clip information that the user listened to on the radio at a later time without the need to memorize the information or wait hopefully for the disc jockey on the radio to provide that information. In this manner, if the user wants to, for example, purchase the music album which the user has marked using the electronic music marker device, the user can easily identify the necessary information related to the marked music clip from the e-marks provided by the electronic music marker device.

To download or obtain information corresponding to the bookmarked music clips, the user sets up an electronic music marker device account via the gateway device, and connects the music marker device to the server terminal of emarker-.com web site. The information corresponding to the bookmarked music clips such as the name of the artist, the name of the song as well as the name of the album, for example, are transmitted from the server terminal to the user's gateway device for display thereon. However, given a large number of radio stations in most metropolitan areas, it is likely that the radio stations broadcast the same songs or songs from the same album in the course of a day or even afternoon. Additionally, listeners generally only listen to one radio station at a time, such that listeners do not know whatever the other radio stations may be broadcasting at that time, which may include songs that the listeners may be interested in listening to. In particular, the users of the music marker device, even if they have similar taste in music, may not necessarily be listening to the same radio station at the same time and bookmarking the same broadcasted songs.

SUMMARY OF THE INVENTION

In view of the foregoing, a data marking device data searching system of one embodiment includes a data network, a user terminal coupled to the data network configured to transmit a search request corresponding to a marked data, and a server terminal coupled to a data network configured to access one or more storage units in response to the search request received from the user terminal, and to transmit a result corresponding to the search request to the user terminal.

A data marking device data searching system of another embodiment includes a data network, a plurality of user terminals each coupled to the data network, one of the user terminals configured to transmit a search request corresponding to a marked data, and a server terminal coupled to the data network configured to access storage units each corresponding to a respective one of the plurality of user terminals in response to the search request received from the one user terminal, and to transmit a result corresponding to the search request to the one user terminal.

A data marking device data searching system of a further embodiment includes a data network, and a plurality of user terminals each coupled to the data network, one of the user terminal configured to transmit a search request corresponding to a marked data, wherein the one or more other of the plurality of user terminals configured to permit access to the one user terminal to perform a data searching operation.

A method of still a further embodiment includes initiating a music search operation, receiving for display a search pending status data, and receiving a playlist corresponding to the search operation.

A method of yet still a further embodiment includes detecting a data search operation initiation, retrieving information corresponding to the search operation, and transmitting the retrieved information.

A data marking device data searching system of yet still another embodiment includes means for providing a data network, means for connecting to the data network and transmitting a search request corresponding to a marked data, and means for connecting to the data network and accessing one or more storage units in response to the search request received from the user terminal, and transmitting a result corresponding to the search request.

In this manner, in accordance with the various embodiments, users of music marker devices may be able to find broadcasted music clips that are bookmarked by other users that fall in the same or similar category (or genre), or find music clips that other users have bookmarked which are broadcast from the same station but which the users were not able to bookmark during its broadcast. Accordingly, a simple, efficient music searching operation is provided in a dynamic environment where music marker device users can, based on bookmarks of other users, retrieve information corresponding to broadcast music clips bookmarked by others having similar taste in music, or by those who listen to the same radio stations.

These and other features and advantages of the present invention will be understood upon consideration of the following detailed description of the invention and the accompanying drawings.

BRIEF DESCRIPTION OF THE DRAWINGS

FIG. 4 is one embodiment of a database illustration of the bookmarks in a storage unit of the electronic music marker device;

FIG. 9 illustrates one embodiment of a user account database of the server terminal database storage unit shown in FIG. 8;

FIG. 10 illustrates one embodiment of a playlist database of the server terminal data storage unit shown in FIG. 8;

FIG. 11 illustrates one embodiment of a user playlist database of the server terminal data storage unit shown in FIG. 8;

DETAILED DESCRIPTION

Figure 1:
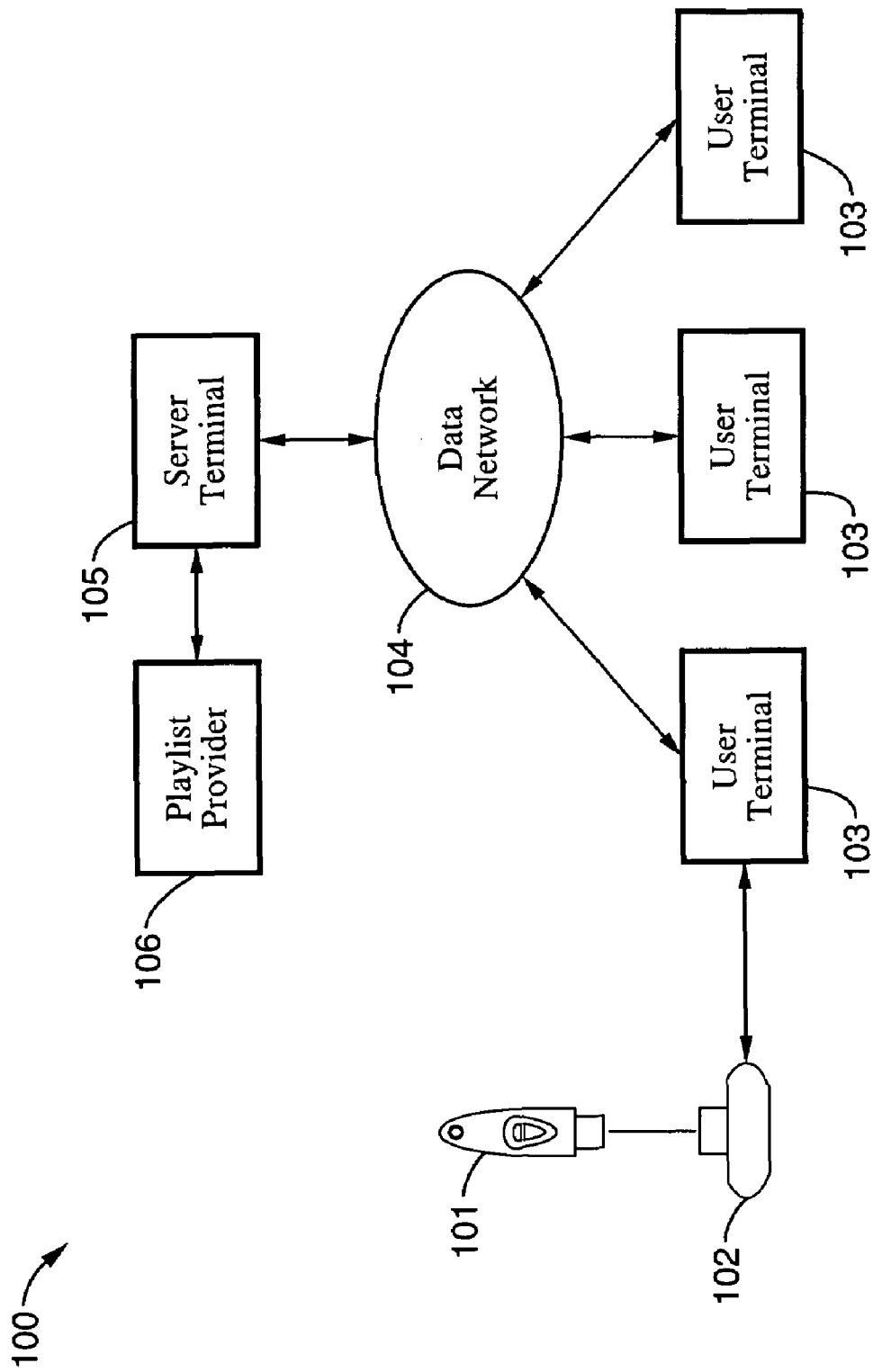
FIG. 1 illustrates an overall electronic music marker device find music system in accordance with one embodiment.

FIG. 1 illustrates an overall electronic music marker device find music system in accordance with one embodiment. Referring to FIG. 1, electronic music marker device find music system 100 includes a plurality of user terminals 103 each connected to data network 104 such as the internet via connection protocols such as TCP/IP, Appletalk, using connection interface unit (not shown) such as a dial-up modem through an internet service provider (ISP), a broadband network such as a DSL or cable modem, a T1 or LAN connection, or any other means for connecting to the internet. Each user terminal 103 is configured to connect to an electronic music marker device 101 via a cradle type connection unit 102, and configured to receive, upon synchronization operation with music marker device 101, bookmark information stored in music marker device 101. In one embodiment, the bookmark information transmitted from music marker device 101 to user terminal 103 may include music marker device 101 unique device identification code, the number of stored bookmarks, and corresponding date and time stamp for each stored bookmarks.

Also shown in FIG. 1 is server terminal 105 connected to data network 104 for communicating with user terminals 103 for data transfer. Moreover, as further shown in FIG. 1, server terminal 105 is coupled to playlist provider 106. Playlist provider 106 is configured to transmit playlist information corresponding to registered radio station broadcasts such as the title, artist and album information for the music broadcast from the registered radio station. In one aspect, playlist provider may be configured to periodically transmit information related to the music broadcast from the registered radio stations over a predetermined period of time. For example, depending upon factors such as the target market for the registered radio station or the geographic location of the registered radio station, playlist provider 106 may be configured to transmit broadcast music clip information to server terminal 105 within ten minutes from the termination of the respective music broadcast, or alternatively, within 12 or 24 hours from a predetermined broadcast cutoff time such as 10 PM or midnight. Moreover, while playlist provider 106 is shown as communicating with server terminal 105 via a dedicated connection, within the scope of the present invention, server terminal 105 and playlist provider 106 may communicate via a connection through data network 104 for data transfer.

Figure 2:
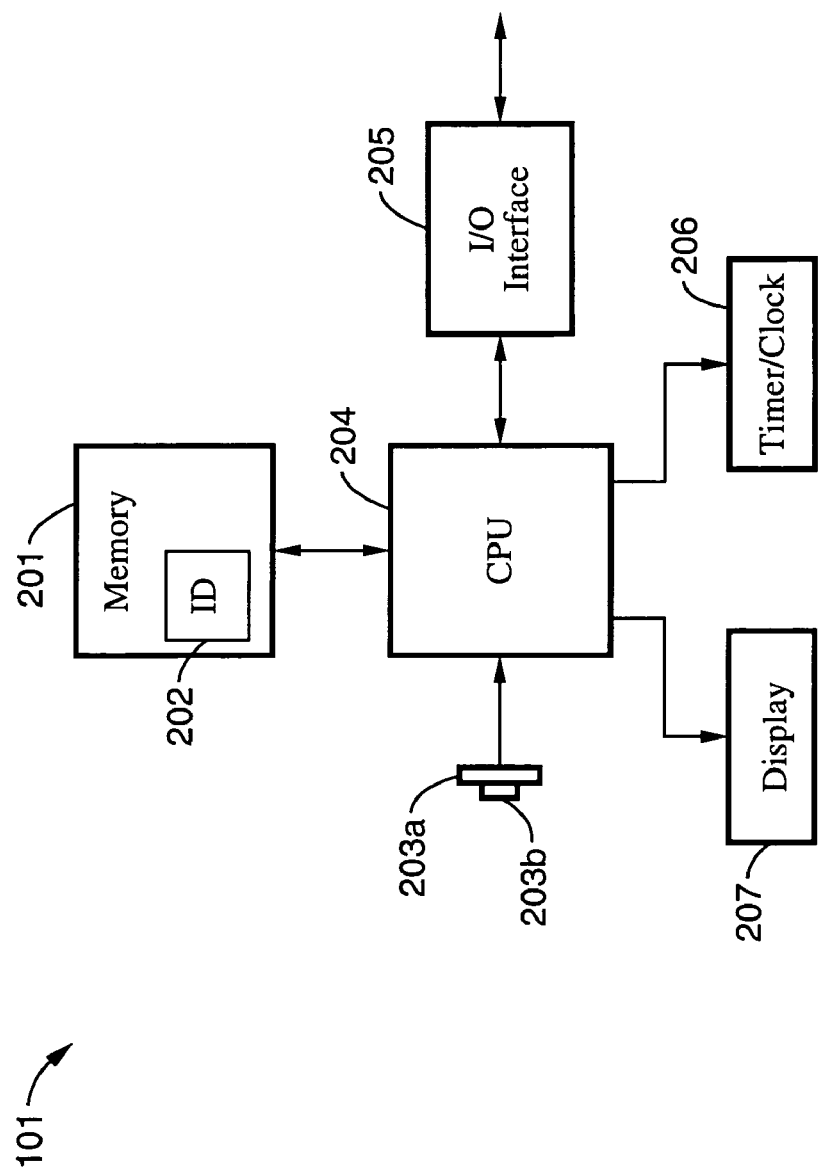
FIG. 2 illustrates a block diagram of the electronic bookmarking device shown in FIG. 1.

FIG. 2 illustrates a block diagram of the electronic music marker device shown in FIG. 1. Referring to FIG. 2, music marker device 101 includes memory 201 such as a Random Access Memory (RAM) and a Read-Only Memory (ROM), and stored thereon is a unique bookmarking device identification code 202 which can include a predetermined combination of letters or numbers, or a combination of both. In one embodiment, identification code 202 can include a thirteen-digit number which is unique to each bookmarking device and is pre-stored in the ROM portion of memory 201.

Further shown in FIG. 2 is controller (CPU) 204 which is configured to control the various components of bookmarking device 101 as shown such as display unit 207, input units 203A, 203B such as bookmarking buttons for bookmarking broadcast music clips over a registered radio or television station, or for bookmarking locations, input/output (I/O) interface 205, clock/timer 206, and memory 201. As can be seen from FIG. 2, upon receiving an input signal from a user of music marker device 101 via input units 203A, 203B, controller 204 may be configured to access the various components of device 101 depending upon the input command received from the user, to perform one or a plurality of processings, executing the input command of the user.

Moreover, I/O interface 205 of music marker device 101 shown in FIG. 2 may be configured to, under the control of controller 204, interface with server terminal 105. Display unit 207 in accordance with one embodiment of the present invention may include a liquid crystal display (LCD), a plasma-type display, and the like, configured to display text or image data, or a combined text and image data. Furthermore, as discussed above, the input unit 203A, 203B may include spring-loaded type input buttons for operation by the user's finger. Alternatively, input unit 203A, 203B may include a touchpad-type screen integrated with display unit 207 for simultaneously inputting and displaying information, where the user can tap the pressure-sensitive screen using a stylus or the like to enter input commands. Timer/clock 206 of music marker device 101 in accordance with one aspect of the present invention may be configured to provide actual time information as well as generate an elapsed time information depending upon the input command from the user under the control of controller 204.

Figure 3:
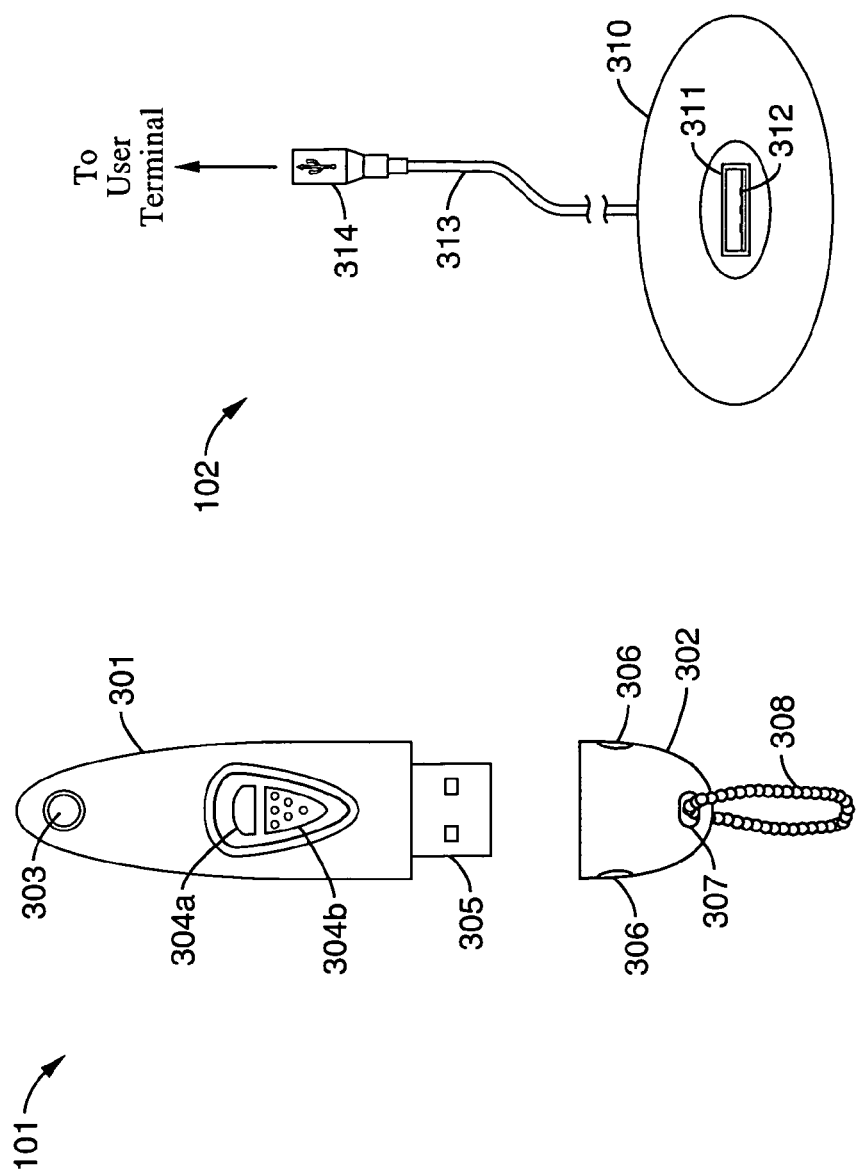
FIG. 3 illustrates an electronic music marker device and cradle-type docking connection.

FIG. 3 illustrates an electronic music marker device and cradle-type docking connection of one embodiment. Referring to FIG. 3, music marker device 101 includes a housing comprising body 301 and cap 302. Body 301 is provided with e-mark button 303 which is configured for user input commands. Also provided on body 301 are display panels 304a and 304b which are configured to display the number of user inputted e-marks and the type of registered broadcast station for the corresponding e-marks, respectively. Finally, body 301 includes communication port 305 such as a USB port which is integrated onto body 301 such that, as will be discussed in further detail below, body 301 may be placed on top of cradle type connection 102 with communication port 305 capable of being plugged into the corresponding port on cradle 102.

Cap 302 can be attached to body 301 when access to communication port 305 is unnecessary. As shown, cap 302 is provided with a pair of release/lock buttons 306 on either side of cap 302 such that by depressing release/lock buttons 306 when cap 302 is locked with body 301, cap 302 can be released from a locked position and communication port 305 may be accessed. Furthermore, cap 302 is provided with hole 307 substantially at its edge position such that link chain 308 can be looped through hole 307 to allow the user to attach the music marker device 101 to a key chain or the like.

Referring back to FIG. 3, cradle-type connection 102 is provided with cradle base 310 substantially flat on its bottom surface (not shown) to rest cradle 102 on a flat surface such as a desktop and a book shelf. On the other side of the bottom surface of cradle 102 is receiving section 311 substantially positioned on the middle of cradle 102, where communication port 312 such as a USB port is provided for connection to communication port 305 of the music marker device 110. Also shown in FIG. 3 is cable 313 attached to cradle connection 102 with a communication port 314 at its other end. In this manner, cradle 102 may be connected to user terminal 103 accessing the user's electronic music marker device account over an internet connection.

Additional detailed information relating to the operation of the electronic music marker device 110 may be found in pending application Ser. No. 09/126,007 filed on Jul. 29, 1998 and application Ser. No. 09/401,105 filed on Sep. 22, 1999, both assigned to Sony Corporation, joint-assignee of the present application with Sony Electronics, Inc., a subsidiary of Sony Corporation, the disclosures of each of which are herein incorporated in their entirely by reference for all purposes.

FIG. 4 is one embodiment of a database illustration of the bookmarks in a storage unit of the electronic music marker device. Referring to FIG. 4, storage unit such as a random access memory (RAM) and/or a read-only memory (ROM) may be configured to store device ID unique for each marker device 101 in device ID field 410. Additionally, storage unit of marker device 101 may also be configured to store bookmarks input by the user in bookmark field 420, with a corresponding date and time information (for example, a time stamp) for the respective bookmarks in date field 430 and time field 440, respectively. In this manner, when music marker device 101 is connected to server terminal 105 via user terminal 103, information stored in marker device storage unit such as the bookmarks and the corresponding date and time stamp information may be transmitted to server terminal 105.

Figure 5:
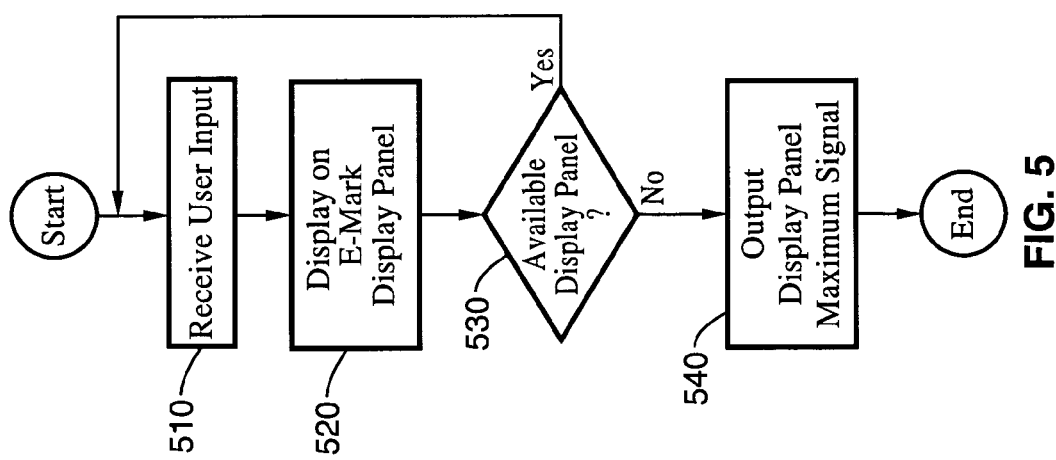
FIG. 5 is a flowchart for illustrating one embodiment of the electronic music marker device operation.

FIG. 5 is a flowchart for illustrating one embodiment of the electronic music marker device operation. Referring to FIG. 5, at step 510, electronic music marker device 101 detects user's input operation of e-mark buttons 203A, 203B. Then, at step 520, music marker device 101 illuminates or flashes a corresponding e-mark display panel 304a, 304b. As discussed above, in one embodiment, the corresponding e-mark display panel 304a, 304b may be configured to display time and/or date information of the user's input operation of e-mark buttons 203A, 203B.

At step 530, music marker 101 determines whether all available e-mark display panels 304a, 304b are being used (for example, illuminated or flashing in response to user's input operation of e-mark button 203A, 203B). If it is determined that there are e-mark display panels 304a, 304b available, music marker device 101 waits for further input operation by the user at step 510. On the other hand, if it is determined at step 530 that all available e-mark display panels 304a, 304b are in use, then at step 540, electronic music marker device 101 generates an output signal to inform the user that music marker device 101 has reached its maximum number of e-marks that it can handle, and the procedure ends. In one embodiment, the output signal from music marker device 101 to inform the user that it has reached its maximum number of e-marks it can handle may be an audible output signal such as an audible tone via an audio output terminal (not shown). Alternatively, music marker device 101 may be configured to flash all e-mark display panels 203A, 203B simultaneously for a predetermined period of time to visually indicate to the user that it has reached its maximum number of e-marks that it can handle.

Figure 6:
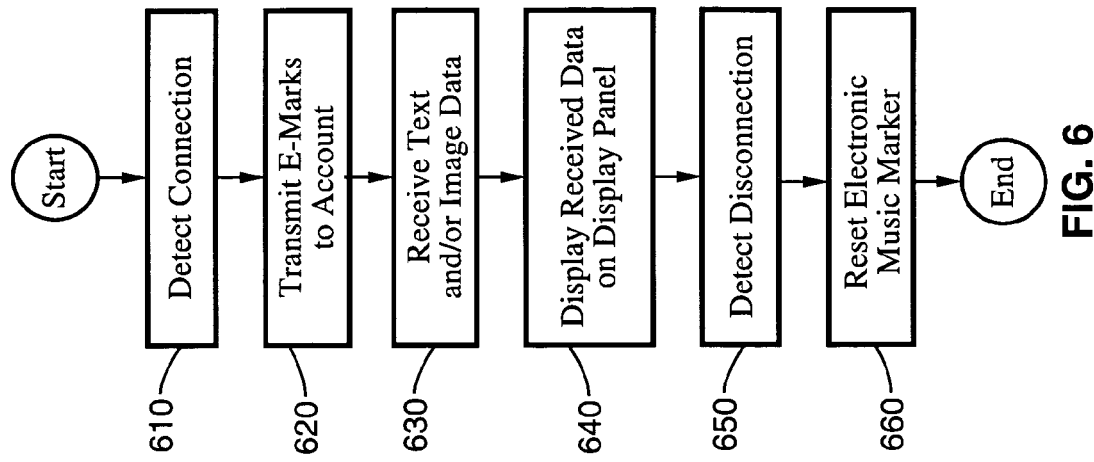
FIG. 6 is a flowchart for illustrating one embodiment of downloading data from the user's electronic music marker device account to the music marker device.

FIG. 6 is a flowchart for illustrating one embodiment of downloading data from the user's e-marker account to the music marker device. Referring to FIG. 6, at step 610, music marker device 101 detects a connection to user terminal 103 connected to the internet. After the user enters the user's account information and performs necessary e-marker account access steps at user terminal 103, at step 620, data corresponding to the e-marks (bookmarks) stored in music marker device 101 is transmitted to the user's e-marker account via gateway terminal 130, and in response, the corresponding text and/or image (including video) data are retrieved from server terminal 105 of e-marker.com web site and transmitted to the user's e-marker account. Then, at step 630, the text and/or image data corresponding to each e-marks are downloaded onto music marker device 101. At step 640, the downloaded text and/or image data are displayed on each corresponding e-mark display panel 304a, 304b on music marker device 101.

When the user disconnects music marker device 110 from user terminal 103, the termination is detected at step 650, and at step 660, music marker device 101 is reset such that previously stored e-marks which have been input by the user may be erased from the storage unit of music marker device 101, and correspondingly, the illuminated e-mark display panels 304a, 304b are turned off. The user may then operate e-mark button 203A, 203B again to input additional bookmarks of music clip broadcasts from registered radio and television broadcast stations.

Figure 7:
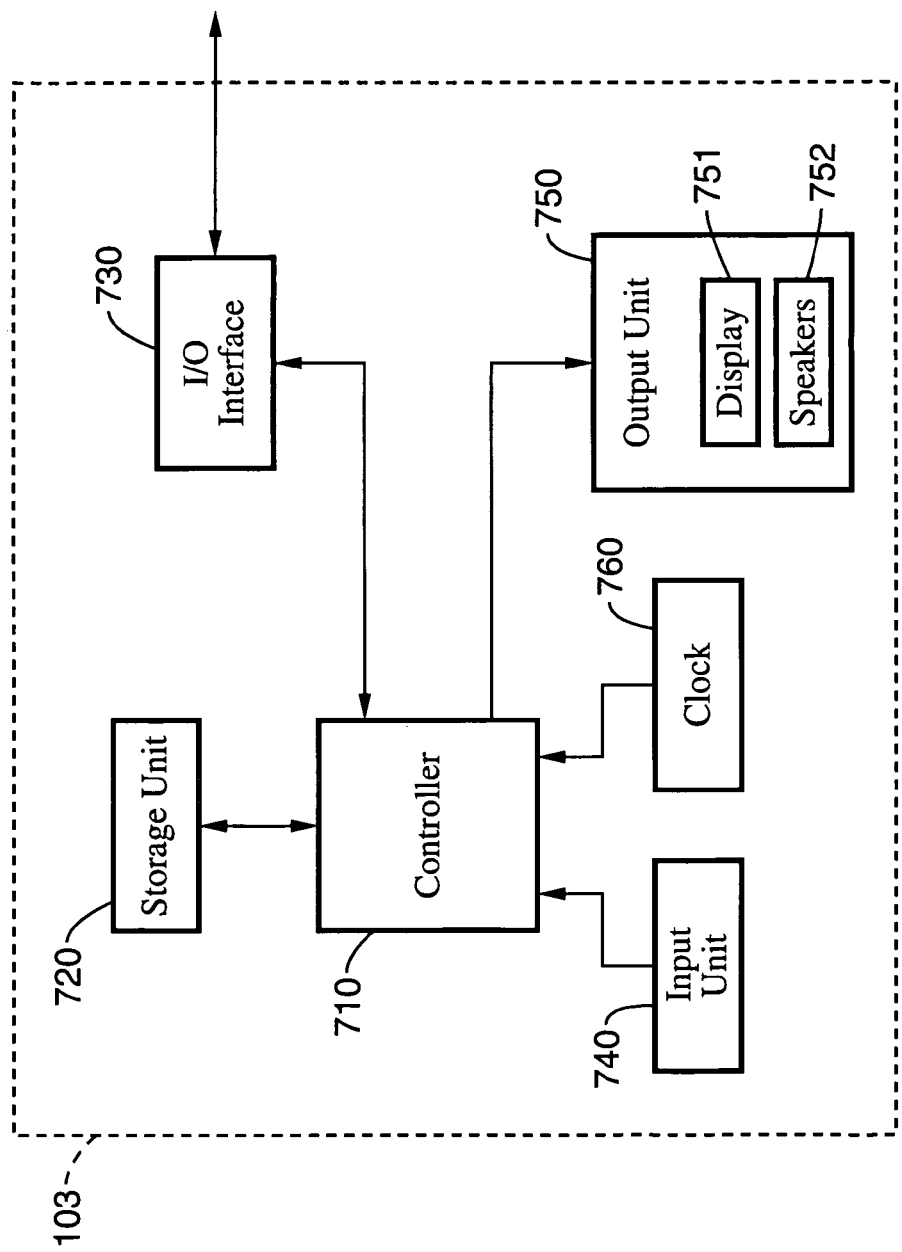
FIG. 7 illustrates one embodiment of a user terminal of the electronic music marker device find music system shown in FIG. 1.

FIG. 7 illustrates one embodiment of a user terminal of the electronic music marker device music find system. Referring to FIG. 7, user terminal 103 in one embodiment may include controller 710, storage unit 720, I/O interface unit 730, input unit 740, output unit 750 and clock 760. Storage unit 720 of user terminal 103 may include one or more of an internal or an external storage device such as a hard disc drive (HDD), a CD-RW drive, or a zip drive. Input unit 740 of user terminal 103 may include one of or a combination of a keyboard, a mouse, a touchpad input device and a voice-recognition type input terminal including a microphone with corresponding software installed in user terminal 103 for performing input operations by voice commands. Controller 710 is coupled to input unit 740 and accordingly, may be configured to process the input data received from input unit 740. Storage unit 720 is similarly coupled to controller 720, and may be configured to store inputted data received from input unit 740 or other data received by user terminal 103. Clock 760 also coupled to controller 710 may be configured to provide time information to controller 710 which, in turn, may be stored in storage unit 720 as discussed in further detail below.

Referring back to FIG. 7, I/O interface unit 730 in one embodiment may be coupled to controller 710, and may be configured to interface with other user terminals 103 in the network or to communicate with server terminal 105. In one embodiment, I/O interface circuit 730 of user terminal 103 may include a communication port configured to connect to the date network 104 such as the internet via connections such as, but not limited to, a modem dial-up through an internet service provider (ISP), a DSL or cable modem-type connection, and a T1, IDSN or LAN type connection. Communication port integrated in I/O interface circuit 230 may include, among others, one of a USB port, a serial port, a parallel port, an IEEE 1394 communication port, a IrDA communication port, and a Bluetooth enabled communication port.

Referring again to FIG. 7, output unit 750 of user terminal 103 may include display unit 751 and speakers 752. Display unit 751 may be configured to output text, image (for example, in .jpg or .gif formats) or video data (for example, in .avi or .mpeg formats) while speakers may be configured to output sound data in the form of, for example, .wav file format. In this manner, user terminal 103 in one embodiment may be configured to communicate with server terminal 105 over the internet connection 104.

Figure 8:
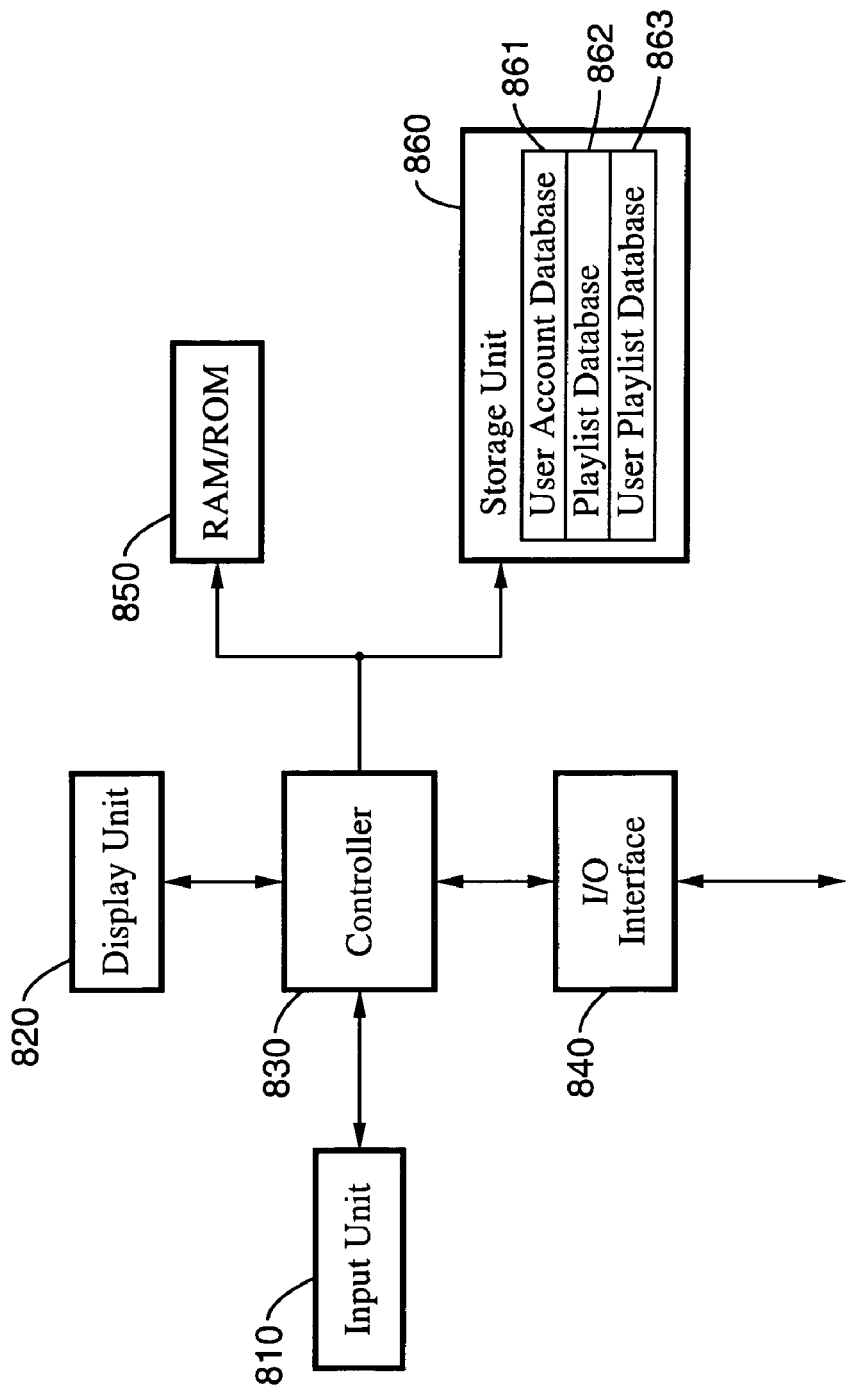
FIG. 8 illustrates one embodiment of the server terminal of the electronic music marker device find music system shown in FIG. 1.

FIG. 8 illustrates one embodiment of a server terminal in the electronic music marker device find music system. Referring to FIG. 8, server terminal 105 includes display unit 820, input unit 810, controller 830, input/output (I/O) interface unit 840, memory (RAM/ROM) 850, and storage unit 860. Display unit 820 may be configured to display various information including the status of server terminal 105 connection, data transfer processing status, data upload information, and any other information related to the operation of server terminal 105.

Input unit 810 of server terminal 105 may be configured to provide input means for operations such as server terminal maintenance, data backup, data query and so on. As can be seen, both display unit 111 and input unit 810 are coupled to controller 830. In one embodiment, controller 830 may be configured to control the display of information on display unit 820 in accordance with input operations received from input unit 810. Alternatively, server terminal 105 may exclude display unit 820.

Referring back to FIG. 8, controller 830 of server terminal 105 is further coupled to memory 850, storage unit 860 and I/O interface unit 840. In one embodiment, controller 830 may be configured to control data access, retrieval and updating of the stored data in storage unit 860. Moreover, controller 830 may further be configured to control the operation of I/O interface unit 840 which communicates with other terminals connected in the network over the internet connection 104. In one embodiment, I/O interface circuit 840 may include a communication port configured to connect to other terminals in the network via connections such as, but not limited to, a modem dial-up through an internet service provider (ISP), a DSL or cable modem-type connection, and a T1, ISDN or LAN type connection. Communication port integrated in I/O interface circuit 840 may include, among others, one of a USB port, a serial port, a parallel port, an IEEE 1394 communication port, a IrDA communication port, and a Bluetooth enabled communication port.

Referring again to FIG. 8, storage unit 860 of server terminal 105 may include internal or external storage devices such as a hard disc drive (HDD), a CD-RW drive, or a zip drive. In one embodiment, storage unit 860 may be configured to storage a variety of data received by server terminal 105 and processed by server terminal 105. In particular, storage unit 860 may include user account database 861, playlist database 862, and user playlist database 863. User account database 860 as discussed in further detail below may be configured to store information related to the registered users of the e-marker system such as, for example, user name, address, account name, account password, and account status. Playlist database 862 may be configured to store playlists for each registered radio station broadcasts periodically received from playlist provider 106. Additionally, user playlist database 863 may be configured to store music clip broadcast playlists corresponding to the user's bookmarks.

As further shown in FIG. 8, controller is coupled to memory 850 for accessing software and drivers for performing the various functions and processes of server terminal 105 for the electronic music marker device find music system. Indeed, in one embodiment, the electronic music marker device find music system may be embodied as a computer program developed using an object oriented language that allows the modeling of complex systems with modular objects to create abstractions that are representative of real world, physical objects and their interrelationships. However, it would be understood by one of ordinary skill in the art that the various embodiments as described herein may be implemented in many different ways using a wide range of programming techniques as well as general purpose hardware systems or dedicated controllers.

FIG. 9 illustrates a user account database of server terminal 105 storage unit 860 shown in FIG. 8. Referring to FIG. 9, user account database 861 may include a user name field 910, a marker identification (ID) field 920, a user account name field 930, a user billing information field 940, and a user contact information field 950. As can be seen from the figure, user name field 910 may be configured to store the name of the user of music marker device 101, while marker ID field 920 may be configured to store the music marker device ID corresponding to the respective device user name. For example, marker ID field 920 corresponding to the user John First may be configured to store the value "A11-K21-K43-F23" which corresponds to the marker device ID of John First. Moreover, marker ID field 920 corresponding to the user Matt Sawyer may be configured to store the value "K01-U23-N45-167" as the marker ID for Matt Sawyer. In this manner, for each user and their respective electronic music marker devices, a unique marker ID may be stored in user account database 861.

Referring back to FIG. 9, user account name field 930 may be configured to store each user's account name, typically provided by the user, or alternatively, automatically assigned by the server terminal 105 (FIG. 1) upon user registration at the electronic music marker device web site. For example, user account name field 930 corresponding to the user John First may include "Firstj" indicating John First's account name. While the user account names stored in the user account name field 930 are shown as a combination of each user's initials and/or names, in one aspect, the user account name may be a combination of letters and number, a unique series of number, or any other data string which may uniquely identify the respective user.

As can be further seen from FIG. 9, user billing information field 940 may be configured to store billing information such as credit card number, expiration date, and the type of credit card for each user. For example, user billing information field 940 corresponding to the user Helen Owen may be configured to store the value "AM" indicating her American Express card, having a card number "1245-856978-01147". In another aspect, user billing information field 940 may include the user's bank account information such as the user's bank account name, account number, and so on. Moreover, in other embodiments, the user billing information field 940 may include information corresponding to the user's transferable assets that the user wishes use as the preferred payment method for charges incurred, such as, for example, the user's frequent flier miles, the user's bank debit card, and so on.

Referring again to FIG. 9, user contact information field 750 may be configured to store contact information corresponding to each user. For example, in one aspect, user contact information field 950 may be configured to store email addresses of each respective user. Alternatively, user contact information field 950 may be configured to store a telephone number, a facsimile number, a pager number or any other type of contact information for the respective users. Moreover, user account database 861 may be further configured to store other relevant information corresponding to the users. In this manner, from the information stored in user account database 861, server terminal 105 may retrieve information related to the respective user's account as well as to update the information stored in user account database 861 based on received playlists from playlist provider 106 and/or the users themselves who are updating their corresponding account.

FIG. 10 illustrates one embodiment of a playlist database of the server terminal data storage unit shown in FIG. 8. Referring to FIG. 10, playlist database 862 includes broadcast time field 1010, name of music clip field 1020, name of artist field 1030, and name of album field 1040 for storing broadcast information corresponding to music broadcasts from registered radio station having call number KROK. As can be seen, broadcast time field 1010 is configured to store the beginning of the broadcast time for the corresponding music clip as well as the date of broadcast, and each of name of music clip field 1020, name of artist field 1030, and name of album field 1040 is configured to store the corresponding name of the music, the name of the artist and the name of the album for the broadcast music clip.

Indeed, in one embodiment, for each registered radio station, playlist provider 106 may be configured to transmit information related to the broadcasted music to server terminal 105 within a predetermined time from the actual broadcast time. Server terminal 105 is then configured to store the received playlist information for each registered radio stations in storage unit 860. Server terminal 105 may also be configured to update playlist database 862 periodically or at each predetermined interval based on playlist information received from playlist provider 106 such that the data stored in playlist database 862 is maintained as up to date as possible. Furthermore, while only one playlist database 862 is shown in FIG. 8, in accordance with the present invention, server terminal 105 may be configured to generate, store and update a playlist database similar to that shown in FIG. 10 for each radio broadcast station. Moreover, within the scope of the present invention, additional data fields may be incorporated in playlist database 862. Such additional data may include, for example, the number of music clip broadcast over a predetermined time period such as the number of same song broadcast within one day, the frequency information corresponding to the radio station broadcasting the music clips, and the Billboard chart ranking for each broadcast music album.

FIG. 11 illustrates one embodiment of a user playlist database of the server terminal data storage unit shown in FIG. 8. Referring to FIG. 11, playlist database 863 stored in server terminal 105 for user John First having user account name "FirstJ" includes music title field 1110, name of artist field 1120 corresponding to the name of the music title stored in music title field 1110, bookmark event field 1130, corresponding broadcast station field 1140, and genre field 1150.

As can be seen from the Figure, for each bookmark entered by John First using his electronic music marker device, once connected and synchronized with server terminal 105 via user terminal 103, information corresponding to the bookmarks are stored in the respective fields of user playlist database 863. For example, it can be seen from FIG. 11 that John First bookmarked the broadcast of the song titled "Ride the Lightning" by Metallica at 12:14 PM on Feb. 1, 2001, and that the song was broadcast from a radio station having call number KROK, the song classified in the hard rock category. In this manner, for each user of music marker device, server terminal 105 is configured to generate and store in user playlist database 862 information corresponding to the music broadcasts received from playlist provider 106 and the bookmarking information from each user's music marker device 101 via user terminal 103. Additionally, server terminal 105 may be configured to add additional data fields to user playlist database 863 as well as to modify and update user playlist database 863.

Figure 12:
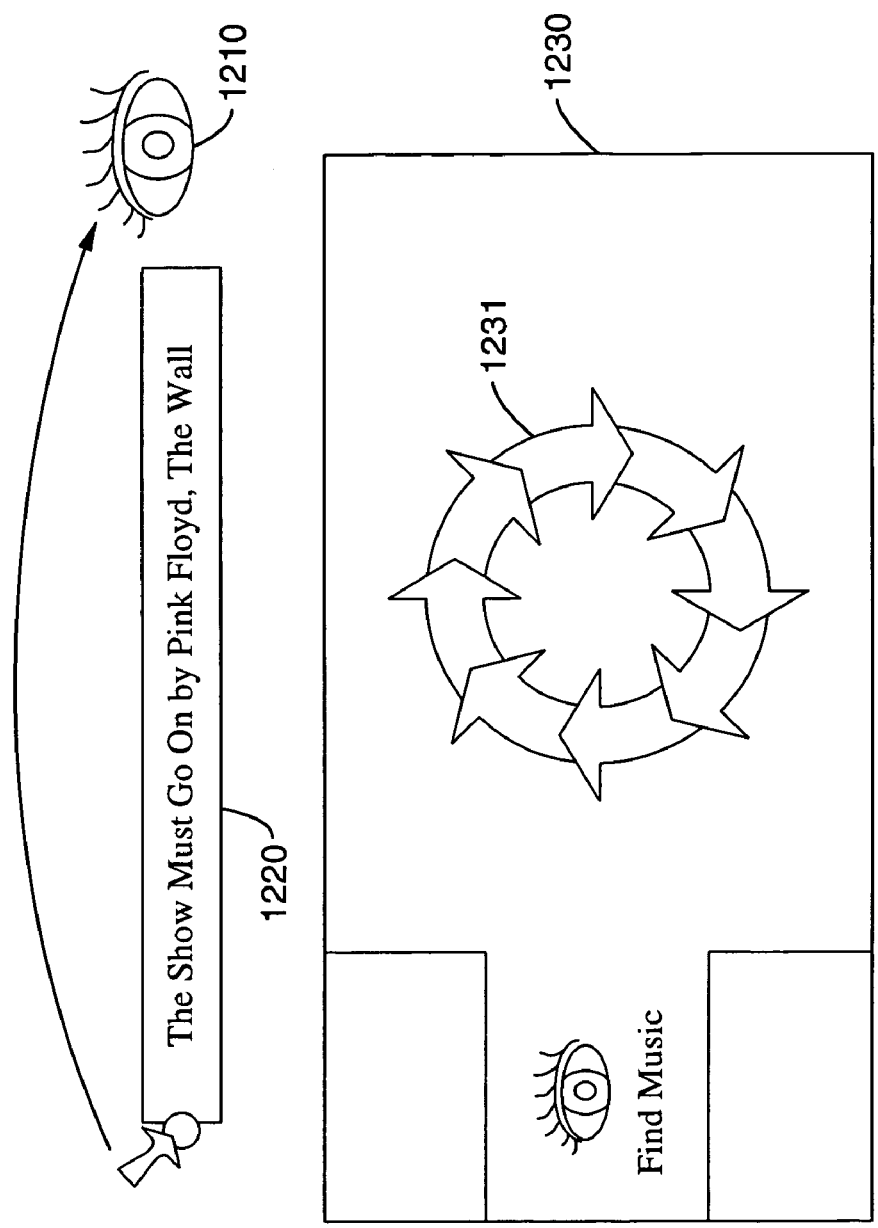
FIG. 12 illustrates one embodiment of a user terminal display for an electronic music marker device music find operation.

FIG. 12 illustrates a screen shot view of electronic music marker device find music function for the overall system in accordance with one embodiment. Referring to FIG. 12, when a user connects the user's music marker device 101 to user terminal 103 (via connection 102) to communicate with server terminal 105 through data network 104, after logging onto the user's electronic music marker device account and downloading the bookmarked information corresponding to the user's bookmarks, the user may be provided with a selection to initiate the find music function. The selection to initiate the find music function may be provided to the user by one of an icon displayed on user terminal 103 display unit 751, by a separate pop-up window displayed on display unit 751, by an audible prompt output to speakers 752 of user terminal 103 output unit 750.

Referring back to FIG. 12, via input unit 740 of user terminal 103, the user may perform a drag and drop operation (using a computer mouse, for example) to drag one of the bookmarked music clips 1220 displayed on display unit 751 and to drop it in find music icon 1210. It should be noted that the user has received the list of bookmarked music clips from server terminal 105, and each of the received bookmarked music clips and the corresponding information is displayed on user terminal 103 output unit 750 as a separate icon or any other equivalent displaying means.

When the bookmarked music clip 1220 is dropped into find music icon 1210, server terminal 105 is configured to transmit search status display 1230 to output unit 750 of user terminal 103 for display thereon. In one embodiment, a ring formation of arrows 1231 is displayed on display unit 751 and is configured to rotate in a clockwise direction indicating that server terminal 103 is processing user's find music request corresponding to the bookmarked music clip dropped into find music icon 1210. After completing the find music operation, server terminal 103 is configured to generate and transmit resulting find music information for display at user terminal 103. In particular, the clockwise rotation of ring formation of arrows 1231 is stopped and a find music operation result is displayed on display unit 751 of user terminal 103.

In one embodiment, the find music operation result may include text and image data corresponding to similar or comparable music clips bookmarked by other users and which fall within the find music operation criteria. In particular, server terminal 105 may be configured to search user playlist database 862 of other music marker users based on the information corresponding to the bookmarked music clip for the find music function. For example, when a user drops the display of music clip "The Show Must Go On" by Pink Floyd into find music icon 1210, server terminal 103 begins a search process in other user playlist databases 862 stored in its storage unit 860 which includes a bookmark to the music clip "The Show Must Go On". If server terminal 103 detects in one of user playlist databases 862 a bookmark to the music clip "The Show Must Go On", then server terminal 103 may be configured to transmit bookmarked playlist information of the detected user playlist database 862 to the user who initiated the find music operation. While server terminal 103 is described above as performing the search process based on the title of the music clip, in accordance with the embodiments of the present invention, server terminal 103 may be configured to perform the search process based on other criteria such as the genre of the bookmarked music clip, the radio station call letter of the station that broadcast the bookmarked music clip, and/or any other combination of factors that may facilitate the search process to find other users' bookmarked music clips who have similar taste in music.

In an alternate embodiment, each user terminal 103 may be configured to communicate directly with other user terminals 103 via data network 104 to perform find music operation. In particular, storage unit 720 of each user terminal 103 may be configured to store the user's user playlist database similar to that shown in FIG. 11 upon synchronizing music marker device 101 with user terminal 103 and retrieving information corresponding to the bookmarked music clips from server terminal 105.

In this case, user terminal 103 may be configured to detect other user terminals connected in data network 104, for example, in electronic music marker device internet domain (www.emarker.com), and depending upon the level of third party access established by the users of respective user terminals 103 accessing their corresponding electronic music marker device accounts, it may be possible to retrieve information corresponding to music clips bookmarked by other users. Additionally, in one embodiment, users may establish the desired level of third party access to their corresponding user terminals 103 such as, limited access, unlimited access, and no access type levels to allow restricted searches, unrestricted searches, and no searches, respectively, by other user terminals 103 executing the find music operation.

Figure 13:
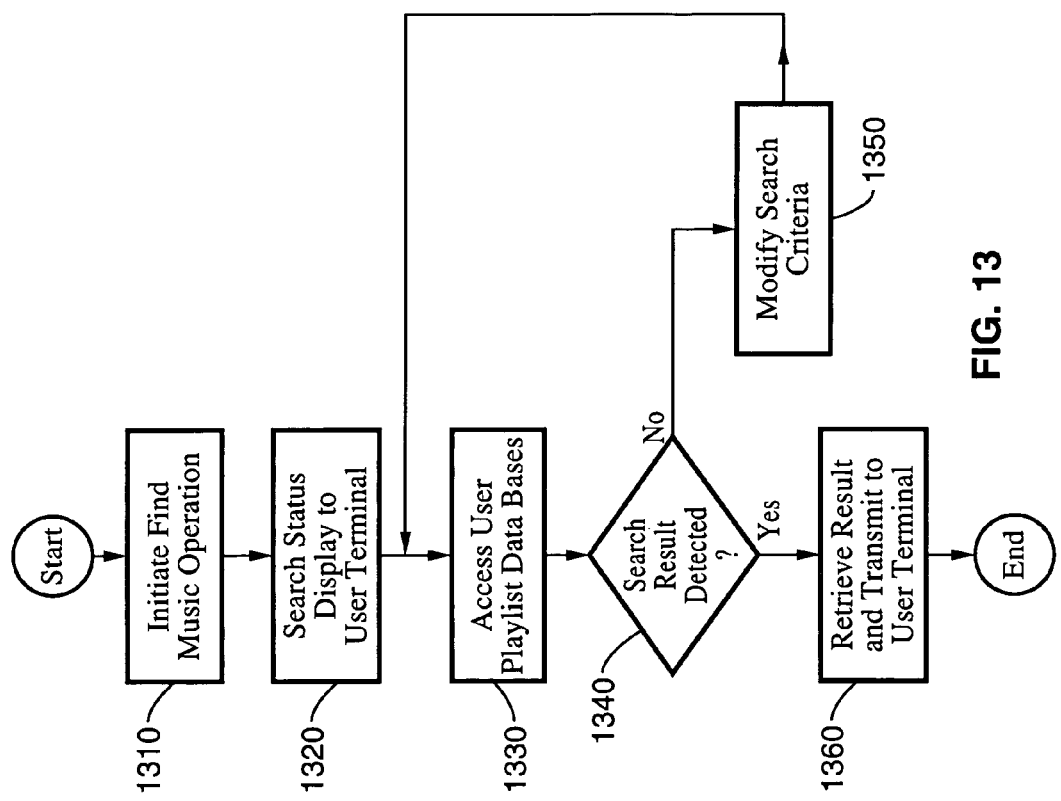
FIG. 13 illustrates a flowchart for one embodiment of an electronic music marker device music find function.

FIG. 13 illustrates a flowchart for one embodiment of an e-marker music find function. Referring to FIG. 14, at step 1310 user initiates the find music operation from user terminal 103 as described above. Then at step 1320, search status pending display is output to display unit 751 of user terminal 103 output unit 750 for example, such as ring formation of arrows 1231 shown in FIG. 12 is displayed on display unit 751 rotating in a clockwise direction. At step 1330, in one embodiment, server terminal 105 accesses user playlist databases 862 to retrieve playlists of bookmarked music clips corresponding to the bookmarked music clip which was used to initiate the find music operation. In an alternate embodiment, user terminals 103 may directly communicate with one another to execute find music operations.

At step 1340, it is determined whether resulting playlists of bookmarked music clips are detected from user playlist databases 862. If no resulting playlist is detected, then at step 1350, the searching criteria for the find music operation is refined to broaden the searching function, for example, including just the name of the interested music clip rather than the name of the music clip as well as the broadcasting radio station. The procedure returns to step 1330 for and repeats the user playlist database searching again.

On the other hand, if at step 1340 it is determined that matching playlists are detected based on the user initiated find music operation, then at step 1360, the matching playlists (or bookmarked music clips individually) are retrieved from the corresponding user playlist database 862, and transmitted to user terminal 103 that initiated the find music operation.

In this manner, in accordance with the various embodiments, users of music marker devices 101 may be able to find broadcasted music clips that are bookmarked by other users that fall in the same or similar category (or genre), or find music clips that other users have bookmarked which are broadcast from the same station but which the users were not able to bookmark during its broadcast. Accordingly, a simple, efficient music searching operation is provided in a dynamic environment where music marker device users can, based on bookmarks of other users, retrieve information corresponding to broadcast music clips bookmarked by others having similar taste in music, or by those who listen to the same radio stations.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A data marking search system, comprising:
    at least one server computer configured for communicating over a data network;
    at least one user database comprising user information and associated user playlists which are configured for access by said server;
    said user playlists containing information about music clips which have been broadcast;
    wherein said music clip information is associated with corresponding data marks as received from a data marking device;
    at least one broadcast playlist database configured for access by said server and for retaining broadcast playlists containing information about music clips which were broadcast by participating radio stations and which correspond to music clip data marks;
    wherein each said broadcast playlist contains information about the music clips which have been broadcast including clip name and the artist and/or album;
    network interface of said server configured for communicating with a plurality of user terminals each coupled to the data network to transmit a search request corresponding to a marked data, or information about the marked data, wherein said marked data indicates a time and which represents content that is broadcasted at said time and wherein said search request is independent of a frequency corresponding to said content that is broadcasted; and
    programming executable on said server computer for,
        accessing said user database on storage units each corresponding to a respective one of said plurality of user terminals in response to said search request received from one said user terminal,
        searching other user playlists within said user database in response to said search request and locating data marks or associated music clip information that fulfills the conditions of said search, and
        transmitting a result, including data marks or associated music clip information broadcast over one or more radio stations, corresponding to said search request to one said user terminal.

2. The system of claim 1, wherein each of the plurality of user terminals includes one of a personal computer, an Internet access enabled personal digital assistant, Wireless Application Protocol enabled mobile telephone, and an I-mode enabled mobile telephone.

3. The system of claim 1, wherein the plurality of user terminals and said server are coupled to said data network using one of a TCP/IP protocol, and an AppleTalk protocol.

4. The system of claim 1, wherein said search request includes an indication of selecting said marked data with a search command.

5. The system of claim 4, wherein said indication includes a drag and drop operation of an icon representative of said marked data displayed on said one user terminal to an icon representative of said search request.

6. The system of claim 5, wherein said icon representative of said marked data includes a hypertext link.

7. The system of claim 5, wherein said icon representative of said search request includes one of a two-dimensional still image or a three-dimensional still image, and a dynamic video image.

8. The system of claim 1, wherein said programming executable on said server is configured to output a search request in progress display upon one user terminal after said search request is transmitted.

9. The system of claim 1, wherein said conditions of said search are based on music clip title, genre of music, or on broadcast station.

10. The system of claim 9:
wherein each of said one or more user playlist databases includes information corresponding to the marked data corresponding to the respective user terminals; and
wherein said user playlists contain information about music clips which have been broadcast.

11. The system of claim 1, wherein said marked data includes information corresponding to a bookmarked music clip broadcast over a radio station.

12. The system of claim 11, wherein said information corresponding to the bookmarked music clip includes one or more of a name of the music clip, a name of the music clip artist, and a name of the music clip album.

13. The system of claim 1, wherein the result corresponding to the search request transmitted to the user terminal includes one or more of information corresponding to music clips broadcast over one or more radio stations.

14. A data marking search system, comprising:
at least one server computer configured for communicating over a data network;
at least one user database comprising user information and associated user playlists which are configured for access by said server;
said user playlists containing information about music clips which have been broadcast;
wherein said music clip information is associated with corresponding data marks as received from a data marking device;
at least one broadcast database configured for access by said server and for retaining broadcast playlists containing information about music clips which were broadcast by participating radio stations and which correspond to music clip data marks;
wherein each said broadcast playlist contains information about the music clips which have been broadcast including clip name and the artist and/or album;
network interface of said server configured for communicating with a plurality of user terminals each coupled to the data network to transmit a search request corresponding to a marked data, or information about the marked data, wherein said marked data indicates a time and which represents content that is broadcasted at said time and wherein said search request is independent of a frequency corresponding to said content that is broadcasted;
programming executable on said server computer for,
accessing said user database in response to a search request received from a first user operating said one or more of said plurality of user terminals,
searching user playlists for music clips bookmarked by other than said first user within said user database in response to said search request and locating data marks or associated music clip information that fulfills the conditions of said search, and
transmitting a result of said searching, including data marks or associated music clip information about previously broadcast material, to said first user operating one said user terminal in response to said data searching operation.

15. The system of claim 14, wherein conditions of said search are based on music clip title, genre of music, or on broadcast station.

16. The system of claim 14, wherein said programming executable on said server is configured to display a search result on the user terminal based on said data searching operation.

17. The system of claim 14, wherein said searching of user playlists includes accessing a storage unit of another plurality of user terminals and retrieving data corresponding to said marked data.

18. The system of claim 17, wherein said data corresponding to said marked data retrieved from said storage units of said other user terminals includes information corresponding to broadcast music clips marked by the users of the respective other user terminals.

* * * * *